United States Patent
Jacobs

(10) Patent No.: US 7,047,132 B2
(45) Date of Patent: May 16, 2006

(54) MOBILE VEHICLE SENSOR ARRAY

(76) Inventor: Steven Jacobs, 47 Skyline Crest, Monterey, CA (US) 93940

( * ) Notice: Subject to any disclaimer, the term of this patent is extended or adjusted under 35 U.S.C. 154(b) by 54 days.

(21) Appl. No.: 10/756,635

(22) Filed: Jan. 12, 2004

(65) Prior Publication Data

US 2005/0154503 A1   Jul. 14, 2005

(51) Int. Cl.
*G01S 15/04* (2006.01)

(52) U.S. Cl. .................. 701/301; 340/435; 180/167

(58) Field of Classification Search .................. 701/28, 701/300, 301, 223; 342/70, 71, 72; 340/435; 180/167, 169
See application file for complete search history.

(56) References Cited

U.S. PATENT DOCUMENTS

| | | | | |
|---|---|---|---|---|
| 3,842,397 A | * | 10/1974 | Sindle | 367/111 |
| 5,568,589 A | * | 10/1996 | Hwang | 706/52 |
| 5,646,613 A | * | 7/1997 | Cho | 340/903 |
| 5,869,764 A | * | 2/1999 | Schulte | 73/620 |
| 6,128,576 A | * | 10/2000 | Nishimoto et al. | 701/301 |
| 6,166,995 A | * | 12/2000 | Hoenes | 367/99 |
| 6,250,162 B1 | * | 6/2001 | Amaike et al. | 73/642 |
| 6,326,887 B1 | * | 12/2001 | Winner et al. | 340/435 |
| 6,384,718 B1 | * | 5/2002 | Nass et al. | 340/435 |
| 6,445,285 B1 | * | 9/2002 | Sparling | 340/436 |
| 6,721,659 B1 | * | 4/2004 | Stopczynski | 701/301 |
| 6,784,828 B1 | * | 8/2004 | Delcheccolo et al. | 342/70 |
| 6,862,537 B1 | * | 3/2005 | Skrbina et al. | 702/32 |
| 6,873,251 B1 | * | 3/2005 | Schiffmann et al. | 340/436 |
| 6,901,624 B1 | * | 6/2005 | Mori et al. | 15/319 |
| 2005/0034036 A1 | * | 2/2005 | Lages et al. | 714/100 |

FOREIGN PATENT DOCUMENTS

WO       WO 03/001241 A1 *   1/2003

* cited by examiner

*Primary Examiner*—Michael J. Zanelli
(74) *Attorney, Agent, or Firm*—Kenneth W. Green; Edgar W. Averill, Jr.

(57) ABSTRACT

An improved sensor array for a mobile vehicle. The vehicle includes a centerline parallel to a vehicle velocity vector. The sensor array comprises a first sensor mounted to the mobile vehicle at a maximum lateral distance from the centerline near a first side of mobile vehicle and a second sensor mounted to the mobile vehicle at a maximum lateral distance from the centerline near a second side of the vehicle opposite the first side. The first sensor transmits a forward pointing first beam and the second sensor transmits a forward pointing second beam, both beams for detecting an object in the path of the vehicle. A plurality of first oblique beams are pointed to intersect the first beam and a plurality of second oblique beams are pointed to intersect the second beam. The oblique beams, in conjunction with the first and second beams form zones of overlapping beam coverage for better localization of objects in the path of the vehicle.

16 Claims, 8 Drawing Sheets

MOBILE VEHICLE SENSOR ARRAY

REFERENCE DOCUMENT

This application is related to the subject matter discussed in Disclosure Document No. 536507 submitted on Aug. 8, 2003, to the Commissioner for Patents entitled "Reconfigurable 195 Degree Sonar Vision with Peripheral Vision."

TECHNICAL FIELD

This invention relates to a sensor array for a mobile vehicle. More particularly, this invention relates to a sensor array for a mobile vehicle, having a first side, a second side opposite the first side, and a centerline parallel to a vehicle velocity vector. The vehicle includes a first sensor mounted on the vehicle at a maximum lateral distance from the centerline and near the first side, the first sensor transmitting a first forward pointing beam. A second sensor is mounted on the vehicle at a maximum lateral distance from the centerline near the second side, and transmits a second forward pointing beam. A first plurality of oblique sensors residing on the vehicle transmit a plurality of first obliquely pointing beams and a second plurality of oblique sensors residing on the vehicle transmit a plurality of second obliquely pointing beams. The first beam intercepts the first obliquely pointing beams to create a first overlapping beam coverage and the second beam intersects the second obliquely pointing beams to create a second overlapping beam coverage. The overlapping beam coverages help detect and localize objects in the path of the mobile vehicle.

BACKGROUND ART

Control systems for a mobile vehicle need to accurately detect when the mobile vehicle is on a collision course with an object. For example, the mobile vehicle may be an unmanned, robotic cleaning machine. Prior art robotic cleaning machines have problems detecting objects directly ahead of the cleaning machine because sensors suites mounted on known cleaning machines don't accurately detect the presence of an object directly ahead of the left forward and the right forward edges of the cleaning machine. Further, prior art cleaning machines have a limited situational awareness because the sensor suites do not always provide measurements sufficient to accurately determine an object's location ahead of the cleaning machine. Other problems with prior art cleaning machines include that individual sensors cannot begin to listen for a return until the transmit waveform from the sensor is completely transmitted (known as blind range) so that is it difficult to detect objects close to the cleaning machines.

As such, there is a need for an improved sonar suite and control system for the mobile vehicle, which improves the mobile vehicle's detection of the objects directly ahead of the mobile vehicle left and right forward edges, and provides other advantages over prior art cleaning machines such as reduced interference between sensors. Still other needs include improved transmitted beam patterns so that the mobile vehicle accurately detects the distance between the cleaning machine and structures it approaches, i.e., walls, and/or objects located directly in front the mobile vehicle and at the periphery of the sides of the mobile vehicle.

DISCLOSURE OF THE INVENTION

Accordingly, the primary objective of the present invention is to provide an improved sensor array for a mobile vehicle. More specifically, the present invention is a sensor array for a mobile vehicle that travels in a forward direction, which mobile vehicle has a front, a first side, a second side opposite the first side and a vehicle centerline parallel to a vehicle velocity vector. The sensor array includes a plurality of sensors mounted generally along said front of said mobile vehicle transmitting a plurality of object detecting beams. The sensor array comprises a first sensor and a second sensor. A first sensor is mounted on the mobile vehicle at a maximum lateral distance from said centerline near the first side for transmitting a first object detecting beam. A second sensor is mounted on the mobile vehicle at a maximum lateral distance from said centerline near the second side for transmitting a second object detecting beam. As such, the first object detecting beam and the second object detecting beam detect objects ahead of the mobile vehicle. The sensors are preferably selected from a group consisting of piezoelectric sensors, electrostatic sensors, magnetorestrictive sensors, infrared sensors and light detecting and ranging (LIDAR) sensors.

Another feature of the present invention is that the sensor array includes recessing the sensors to reduce blind range. Specifically, in one preferred embodiment of the present invention the sensor array for the mobile vehicle has the first sensor recess-mounted within a periphery of the mobile vehicle and/or the second sensor recess-mounted within a periphery of the mobile vehicle. Such recess mounting allow detection of objects at or near the vehicle periphery. In one preferred embodiment, a sensor array for said mobile vehicle further comprises a third sensor, which said third sensor is mounted in said mobile vehicle adjacent to said first sensor, obliquely transmits a third object detecting beam which intersects with said first object detecting beam to create an overlapping beam zone for detecting objects. In another preferred embodiment, mobile vehicle further comprises a fourth sensor, which said forth sensor is mounted in said mobile vehicle adjacent to said second sensor, obliquely emits a fourth object detecting beam which intersects with said second object detecting beam to create an overlapping beam zone for detecting objects ahead of said mobile vehicle direction of travel.

To further improve detection of objects, an additional feature of the present invention is that the sensor array has the at least two overlapping beam zones wherein sensor data is processed utilizing sensor fusion software. The fusion software increases a confidence level for detecting the object ahead of the mobile vehicle because as the mobile vehicle travels toward the object, the object is detected in successive multiple overlapping beam zones.

Another feature in an alternative preferred embodiment of the present invention is providing acoustic wave matched recesses for the recessed sensors of the array to improve detection performance. Specifically, the sensor array further includes mounting the first sensor within a first acoustic wave matched recess and mounting the second sensor recess-mounted within a second acoustic wave matched recess. For example, the first and second acoustic wave matched recesses may define a small cross-section proximal to the faces of the sensors where pressure waves generated by the sensors have high pressure and small area, and the recesses may define a larger cross-section distal to the faces of the sensors where pressure waves generated by the sensors have lower pressure and greater area.

In one preferred embodiment, a plurality of sensors are asymmetrically spaced-apart sensors that are mounted on the mobile vehicle and that are asymmetrically spaced-apart sensors are not located in the same plane. In another preferred embodiment, a plurality of sensors are symmetrically spaced-apart sensors that are mounted on the mobile vehicle and that all symmetrically spaced-apart sensors are located in the same plane. In this preferred embodiment of the present invention, an engineer may custom position the plurality of sensors to maximize forward area coverage depending on the shape of the mobile vehicle. In one alternative preferred embodiment of the present invention, the spaced-apart sensors comprise sonar sensors each transmitting a beam with a beam width within the range of approximately 12 degrees to approximately 15 degrees. In another preferred embodiment of the present invention, the spaced-apart sensors comprise light emitting and ranging detectors (LIDAR) sensors.

It is another feature of the present invention that the spaced-apart sensors may be arranged in multiple configurations to maximize a field of vision of the mobile vehicle. In particular, in one preferred embodiment of the present invention, the spaced-apart sensors are configured or reconfigured in a U-shape arrangement to achieve an approximate 195-degree field of view for a mobile vehicle comprising a rectangular shape with rounded corners. It is another feature of the present invention, the spaced-apart sensors for the mobile vehicle that are configurable and reconfigurable by a user to suit the shape of the mobile vehicle so that different data coverage areas may be programmed into the sensor array to maximize detection of the objects.

Further, a method for the present invention is disclosed for controlling a direction of travel of a mobile vehicle having a front, a first side, a second side and a centerline, traveling in a forward direction comprising mounting a first sensor to the mobile vehicle at a maximum lateral distance from said centerline near a first side. Afterwards, mounting a second sensor to the mobile vehicle at a maximum lateral distance from said centerline near a second side. Following, the method further comprises transmitting a first object detecting beam from the first sensor ahead of the mobile vehicle, transmitting a second object detecting beam from the second sensor ahead of the mobile vehicle and illuminating an object directly ahead of the left forward edge and the right forward edge of the mobile vehicle by one selected from the group consisting of the beam emitted by the first sensor and the beam emitted by the second sensor. In a further step of the present method, the first sensor and the second sensor mounting further includes recessing the first sensor and the second sensor within a periphery of the mobile vehicle.

An alternative embodiment of the method for controlling the direction of travel of the mobile vehicle further comprises the steps of mounting a third sensor to the mobile vehicle along the front, mounting a fourth sensor to the mobile vehicle on the front to the left of the third sensor, and mounting a fifth sensor to the mobile vehicle on the front to the left of the fourth sensor. Additional steps include the fourth sensor transmitting an fourth object detecting beam which forms overlapping beam zone with the first object detecting beam from the first sensor. Another step includes transmitting a fifth object detecting beam from the fifth sensor, whereby the fifth object detecting beam from the fifth sensor forms an overlapping beam zone with a first object detecting beam from the first sensor.

Another preferred embodiment of the present method for controlling the direction of travel of the mobile vehicle further comprises the steps of collecting data from the overlapping beam zones about the location of the object, and processing the data using fusion software. In the alternative, the present method further includes the step of mounting spaced-apart sensors along the mobile vehicle to provide more than two overlapping beam zones, wherein the spaced-apart sensors are configurable to provide scanning area coverage selected from a range of approximately 190-degrees to approximately 200-degrees. Another alternative embodiment of the present inventive method further includes the step of mounting a third sensor near a center of the front of the mobile vehicle, whereby the third sensor transmits a third object detecting beam comprising a light detecting and ranging (LIDAR) beam at the object in front of the mobile vehicle and at a peripherally located object or a wall.

BRIEF DESCRIPTION OF THE DRAWINGS

For a better understanding of the present invention, reference is made to the below-referenced accompanying drawings. Reference numbers refer to the same or equivalent parts of the present invention through several figures of the drawings.

MODES FOR CARRYING-OUT THE INVENTION

The present invention provides an improved sensor array for a mobile vehicle. Accordingly, the primary objective is to provide an improved sensor array so that the mobile vehicle detects more accurately the location of objects ahead of the mobile vehicle. In particular, the primary objective of the present invention is to provide a mobile vehicle traveling in a forward direction having a front, a first side, a second side, and a centerline with improved detection ability of objects ahead of the mobile vehicle.

Figure 1A:
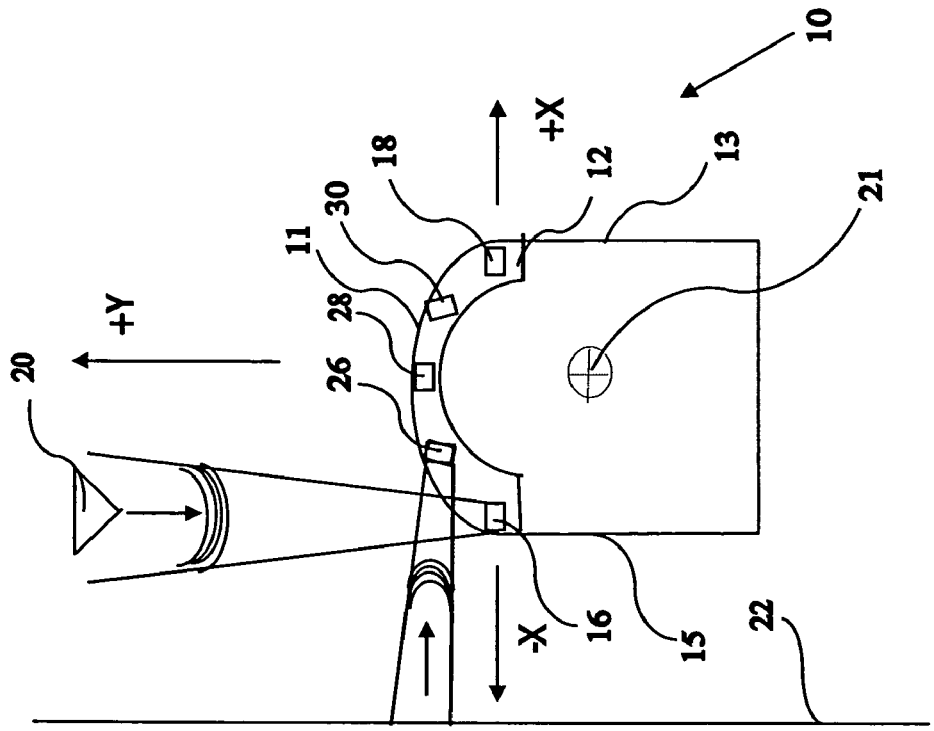
FIG. 1A is a sensor array according to the present invention mounted on a mobile vehicle, and a transmitted waveform.

FIG. 1A is a sensor array mounted on a mobile vehicle 10. The mobile vehicle 10 includes a sensor array 12. In one embodiment of the present invention, mobile vehicle 10 is an unmanned cleaning machine or semiautomatic machine which will follow a programmed path with a minimum or no human supervision. The vehicle 10 generally travels in a forward direction along a vehicle centerline Y parallel to a vehicle velocity vector, and has a first side 15, an a second side 13 opposite the first side 15. Sensor array 12 comprises a plurality of sensors including a first forward looking sensor 16 and a second forward looking sensor 18. The plurality of sensors further includes sensors 26, 28 and 30 which sensors 26, 28 and 30 which are mounted to the mobile vehicle. The first sensor 16, second sensor 18, and sensors 26, 28 and 30 are preferably selected from a group consisting of piezoelectric sensors, electrostatic sensors, magnetorestrictive sensors, light detecting and ranging (LIDAR) sensors or the like. Further, first sensor 16 is mounted on mobile vehicle 10 at a maximum lateral distance from the centerline Y near the first side 15. Second sensor 18 is mounted on mobile vehicle 10 at a maximum lateral distance from centerline Y the second side 13.

Figure 1B:
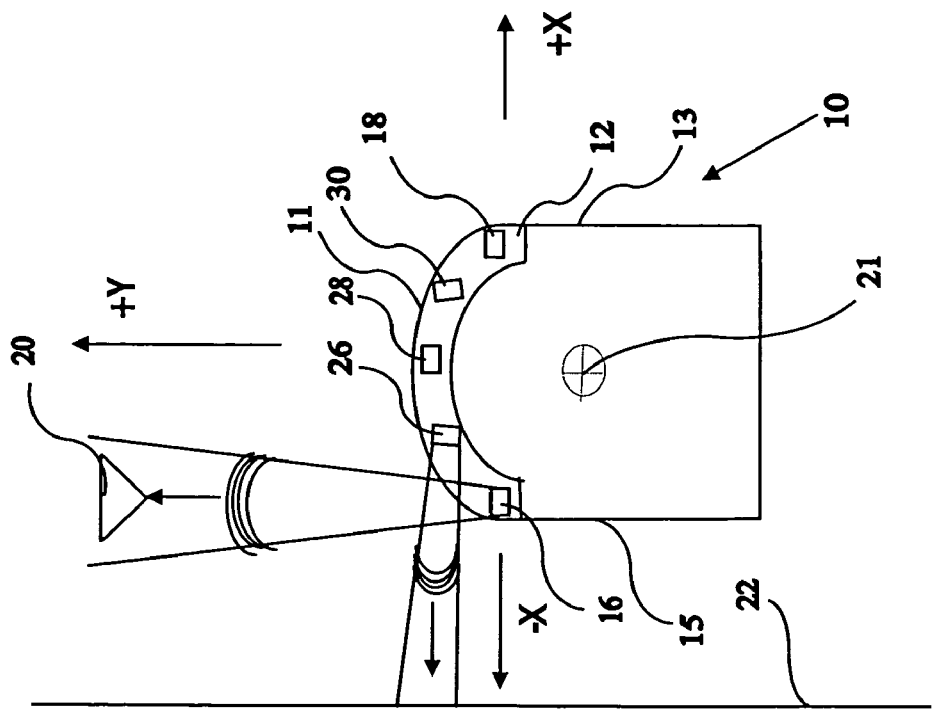
FIG. 1B is the sensor array and a reflected waveform

Continuing with FIG. 1A, sensor array 12 transmits object detecting beams at an object 20 or at a wall 22. Afterwards, as shown in FIG. 1B, the object detecting beams are reflected off the object 20 or the wall 22. Following, sensor array 12 receives these reflected object detecting beams and uses this information to ascertain position. In this embodiment, first sensor 16 and second sensor 18, as well as other sensors 26, 28 and 30 of sensor array 12 are mounted in the same plane. In one preferred embodiment of the present invention, sensor array 12 plurality of sensors comprises symmetrically spaced-apart sensors that are mounted on the mobile vehicle and are all symmetrically spaced apart and are all located in the same plane. In an alternative embodiment of the present invention, sensor array 12 plurality of sensors comprises asymmetrically spaced-apart sensors that are mounted on the mobile vehicle. In one preferred embodiment, the asymmetrically spaced-apart sensors are not located in the same plane so that an engineer may custom design sensor array 12 to maximize area coverage for a given shape of mobile vehicle 10.

Figure 2A:
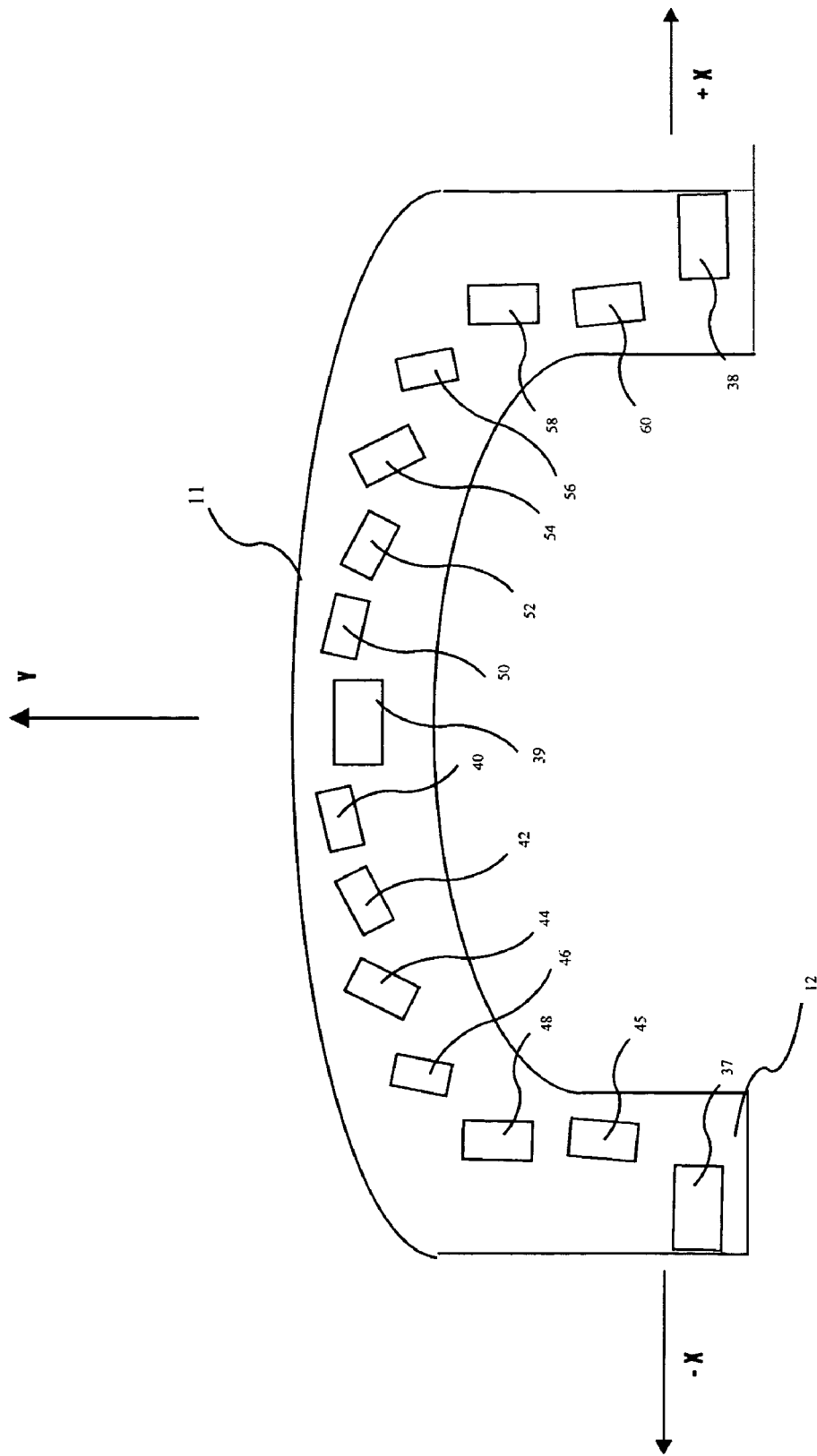
FIG. 2A is an illustration of one preferred embodiment of the present invention depicting the front of a rectangular shaped mobile vehicle with rounded corners.

FIG. 2A is an illustration of one preferred embodiment of the present invention depicting a rectangular shaped mobile vehicle with rounded corners. In particular, this preferred embodiment of the present invention has the spaced-apart sensors for a mobile vehicle comprising a rectangular shape with rounded corners which are arranged in a U-shape. The spaced-apart sensors are preferably sonar sensors and are more preferably Polaroid (now Senscomp) 700 series electrostatic transducers which transmit beams having a beamwidth of 15 degrees. In another preferred embodiment of the present invention, the spaced-apart sensors comprise sonar sensors which transmit beams having a beamwidth within the range of approximately 12 degrees to approximately 15 degrees. However, it should be noted that any type of piezoelectric (ceramic) or electrostatic, sensor having beamwidths from four degrees to sixty degrees may be utilized as the sonar sensors in sensor array 12.

In this preferred embodiment, there are fifteen sensors in the sensor array to create the beam pattern coverage with no gaps, thereby providing approximately 195-degrees of data coverage. Specifically, there is a first transducer 37 mounted at the periphery of the sensor array at maximum lateral distance from the centerline Y and near the first side wherein the first transducer points forward (i.e., at zero degrees). Further, there is a second transducer 38 mounted at the periphery of the sensor array at a maximum lateral distance from the centerline Y and near the second side where the second transducer points forward (i.e., at zero degrees,. There is a third transducer 39 mounted at the center of mobile vehicle 10 at zero degrees to detect objects directly ahead of mobile vehicle 10. Furthermore, there are six transducers to the left of the transducer 39 and pointed away from zero degrees including a fourth transducer 40 pointing at −15 degrees, a fifth transducer 42 pointing at −30 degrees, a sixth transducer 44 pointing at −45 degrees, a seventh transducer 46 pointing at −60 degrees, an eighth transducer 48 pointing at −90 degrees, and a ninth transducer 45 pointing at −75 degrees.

In addition, there are six transducers to the right of the transducer 39 and pointed away from zero degrees including a tenth transducer 50 pointing at +15 degrees, an eleventh transducer 52 pointing at +30 degrees, a twelfth transducer 54 pointing at +45 degrees, a thirteenth transducer 56 pointing at +60 degrees, an fourteenth transducer 58 pointing at +90 degrees, and a fifteenth transducer 60 pointing at +75 degrees. Preferably, the fifteen sensors of the preferred embodiment of the present invention have a beamwidth of fifteen degrees, where 7.5 degrees is on each side of the center of a beam. As such, 7.5 degrees on each side of the center of each of the beam creates a 195-degree field of view.

Figure 2B:
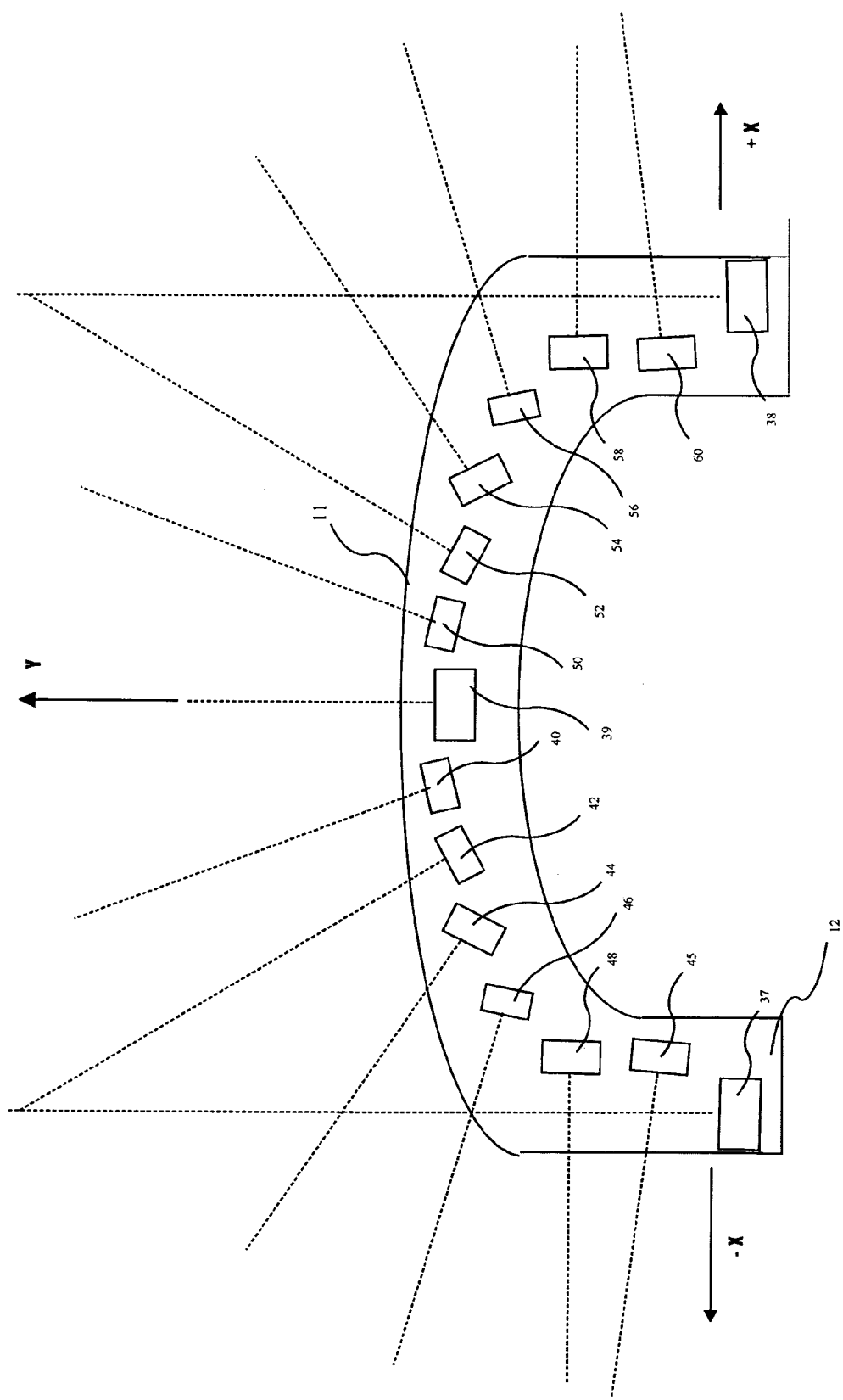
FIG. 2B is an illustration of one preferred embodiment of the present invention depicting the beam pattern pointing directions and overlapping beams for a rectangular shaped mobile vehicle with rounded corners.

FIG. 2B illustrates the beam steering which results in overlapping beam zones for the FIG. 2A preferred embodiment of the present invention. In this preferred embodiment of the present invention, the sensor array includes the first transducer and the second transducer which provide for the detection of objects directly ahead of the left and the right edges of the array. The arrangement of the other transducers, i.e. 40, 42, 44, 46, 48, 45, 50, 52, 54, 56, 58, 60, are mounted to the mobile vehicle in a fan shaped array to transmit an oblique beam pattern. First transducer 37 and second transducer 38 are further positioned to act in conjunction with the fan shaped array providing at least two overlapping beam zones to provide collision data ahead of the front of the mobile vehicle. In particular, these overlapping beam zones creates a stereo field view for detecting objects directly ahead and at the periphery of the mobile vehicle. In another alternative preferred embodiment of the present invention is that the sensor array includes recessing the sensors to provide better detection of objects and less signal interference.

Figure 2C:
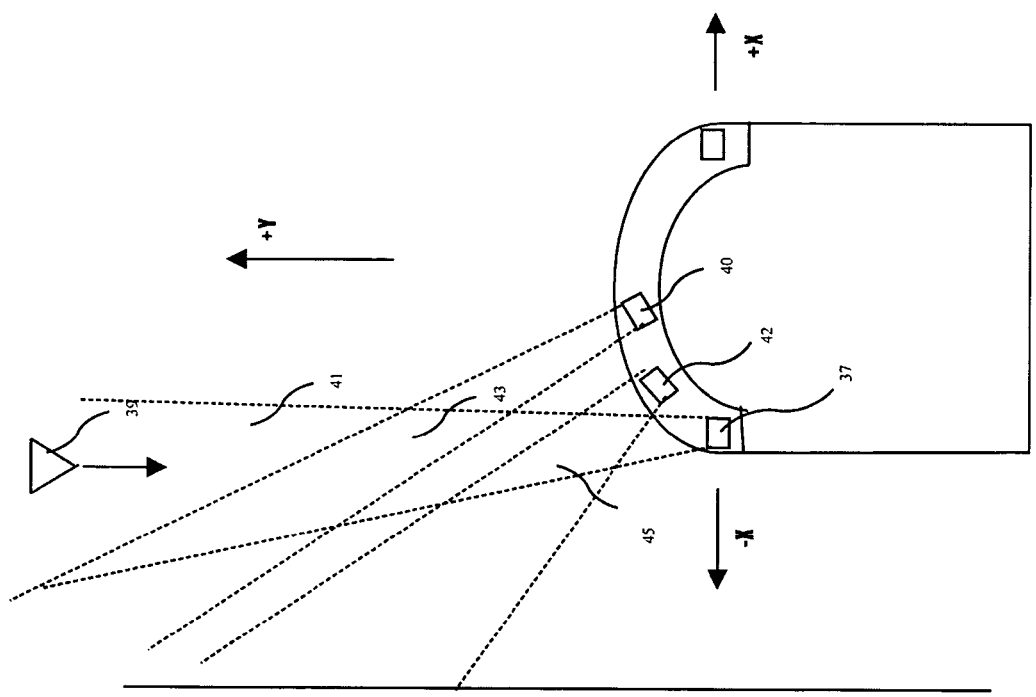
FIGS. 2C, 2D, and 2E are illustrations of the overlapping beam zones, for the FIG. 2A embodiment, created by the spaced apart sensors and the first sensor located at a maximum lateral distance from a centerline near the first side.
Figure 2E:
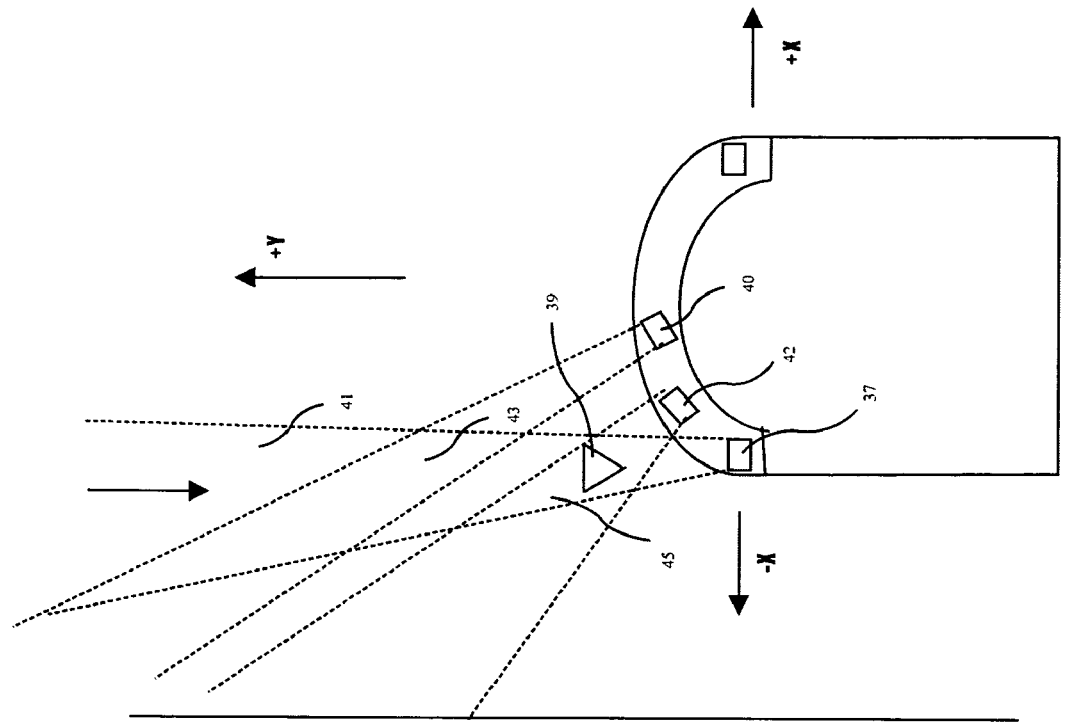
Figure 2D:
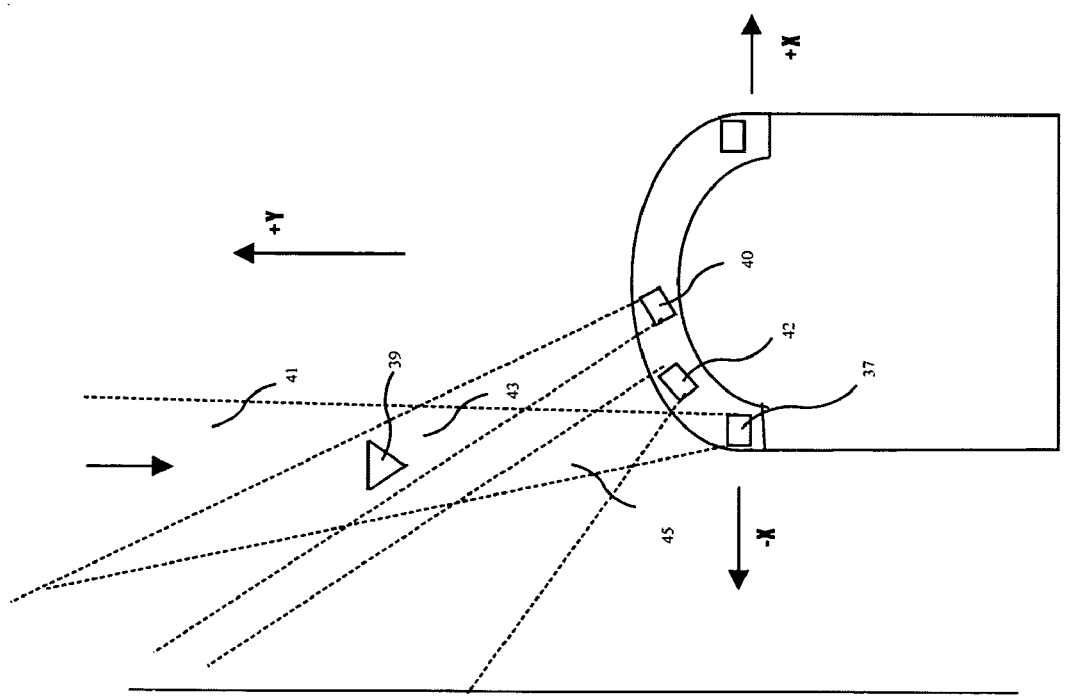

FIG. 2C is an illustration of the overlapping beam zones, for the FIG. 2A embodiment, created by the intersection of the spaced apart sensors and the first sensor at a minimum negative X-direction. Specifically, as shown in FIG. 2C, in one preferred embodiment of the present invention, the sensor array for the mobile vehicle detects objects approaching the mobile vehicle within overlapping beam zones. Each successive time the object is seen, there is created a greater confidence level that the mobile vehicle is approaching the object. For example, an object 39, as shown in FIG. 2C having a triangular shape, exclusively detected by transducer 37 emitted object detecting beam creates a first confidence level that the object 39 is in a zone 41. Afterwards, as shown in FIG. 2D, when the mobile vehicle travels closer to object 39, object 39 is detected within a first overlapping beam zone 43 created by the intersection of the object detecting beam emitted from transducer 40 and the object detecting beam emitted from transducer 37, creating a second confidence level that the mobile vehicle is approaching object 39. Following, as shown in FIG. 2E, when the mobile vehicle travels even closer to object 39, object 39 is detected within a second overlapping beam zone 45 created by the intersection of the object detecting beam emitted by transducer 42 and the object detecting beam emitted from transducer 37, creating a third confidence level that the mobile vehicle is about to contact object 39. In summary, this invention utilizes multiple overlapping beam zones where the object is detected to verify that mobile vehicle 10 is approaching the object. Similar to the first transducer mounted near a first side detecting objects, the second transducer will detect objects using overlapping beam coverage with transducers mounted near the second side of the mobile vehicle.

To further improve detection of objects, an additional feature of the present invention is that the sensor fusion software increases the confidence level for detecting objects. The sensor array creates at least two overlapping beam zones wherein the data is computed through the use of sensor fusion software, whereby a confidence level for detecting the object ahead of the mobile vehicle is increased by the software. Furthermore, this above mentioned transducer arrangement achieves approximately a 195-degree field of vision. It is another feature of the present invention that the spaced-apart sensors may be arranged in multiple configurations to maximize a field of vision of the mobile vehicle. It is another feature of the present invention that the plurality of sensors includes spaced-apart sensors for the mobile vehicle are configurable and reconfigurable by a user so that for different coverage areas, the spaced-apart sensors may be programmed to maximize detection of the object.

TABLE 1

Layout Dimensional Data for 195-degree Sensor Array

| Transducer Number | Degrees from Centerline | Length of the line | Angle sensor points |
|---|---|---|---|
| 37 | (−90) | 13.6 | 0 |
| 45 | (−84) | 13 | −75 |
| 48 | (−76) | 12.62 | −90 |
| 46 | (−65) | 12 | −60 |
| 44 | (−56) | 9.875 | −45 |
| 42 | (−43) | 7.625 | −30 |
| 40 | (−23) | 6.25 | −15 |
| 39 | 0 | 5.875 | 0 |
| 50 | 23 | 6.25 | 15 |
| 52 | 43 | 7.625 | 30 |
| 54 | 46 | 9.875 | 45 |
| 56 | 65 | 12 | 60 |
| 58 | 76 | 12.62 | 90 |
| 60 | 84 | 13 | 75 |
| 38 | 90 | 13.6 | 0 |

Table 1 above describes the mounting instructions for the FIG. 2A preferred embodiment to achieve approximately a 195-degree field of vision. The table represents the layout of the sensors into a U-shaped arrangement that would be suitable for a mobile vehicle. All line lengths and angles are measured from a midpoint on a line segment drawn between the two headlight sensors (first transducer 37 and second transducer 38). This table shows the ideal locations for a sensor array to be used on a mobile vehicle that is a cleaning machine such as the Windsor SG28 or the Nilfisk-Advance Advenger that is to be converted into a mobile robot. It should be noted that transducer 46 and 48 may be interchanged if it is desirable to have the ninety degree transducer moved to the extreme forward position of the mobile vehicle. The individual transducers don't all need to be located in the same vertical plane. Preferably, the individual transducers are mounted to steer the beams to zero degrees vertically. Other transducers may be tilted up or down as desired for detecting objects such as corners, ledges, stairs, or the like.

In an alternative preferred embodiment of the present invention, the spaced-apart sensors for the mobile vehicle comprising a round shape are arranged in a semi-circular arrangement. In another alternative embodiment of the present invention, the sonar array 12 having a plurality of sensors comprises asymmetrically spaced-apart sensors that are mounted on the mobile vehicle. In still another alternative embodiment, the asymmetrically spaced-apart sensors are not located in the same plane. In another alternative embodiment, the asymmetrically spaced-apart sensors are located in the same plane. In yet another alternative the spaced apart sensors may be symmetrically spaced-apart sensors that may or may not be located in the same plane. In this manner, an engineer may custom design the sensor array to maximize area coverage for a given shape of a mobile vehicle.

Figure 3B:
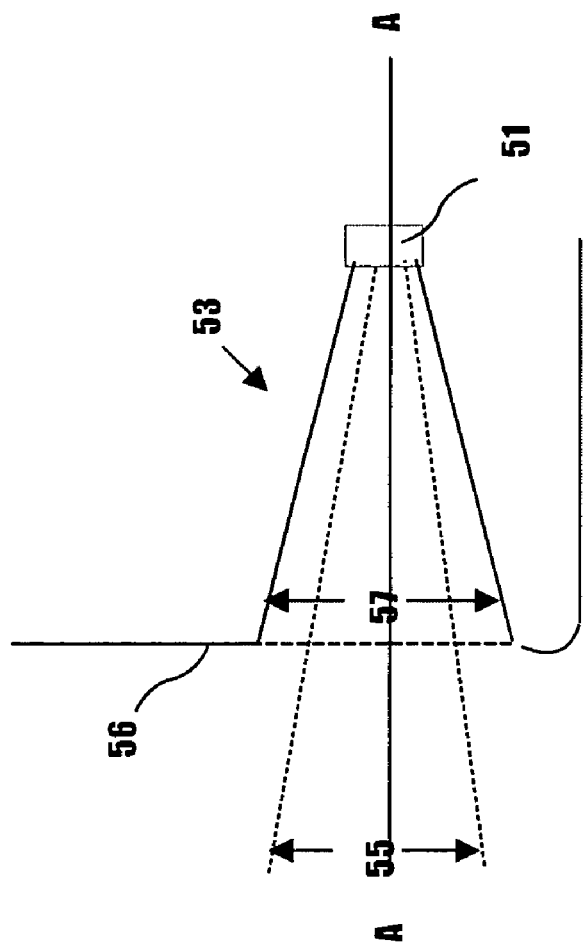
FIG. 3B is a side view of the acoustically tapered recess for one preferred embodiment of the present invention
Figure 3A:
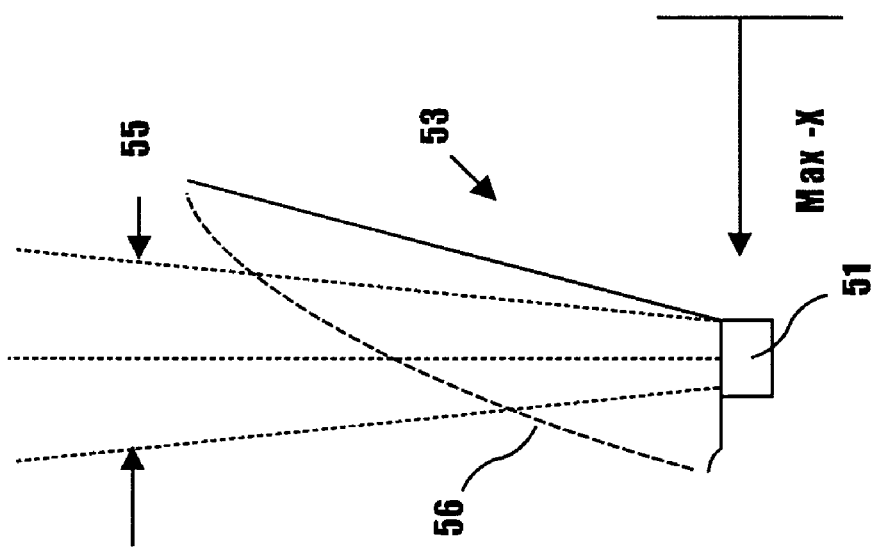
FIG. 3A is a top view of an acoustically tapered recess for one preferred embodiment of the present invention.
Figure 3C:
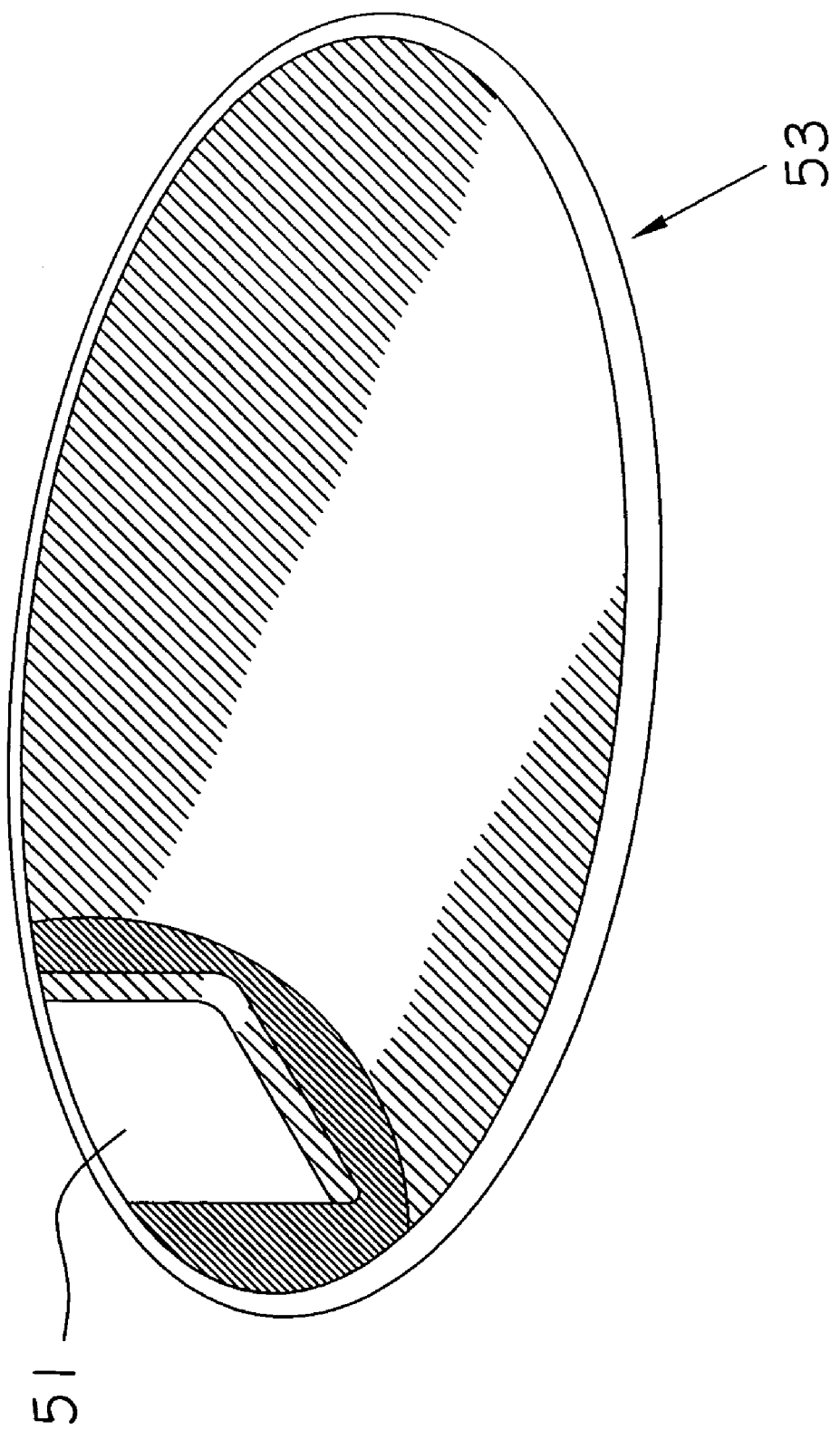
FIG. 3C is a perspective view of the acoustically tapered recess for one preferred embodiment of the present invention

The sensors may be recessed behind the vehicle periphery 11 (see sensors 37 and 38 in FIGS. 2A and 2B) to reduce or eliminate blind range. However, merely mounting a sensor in a sharp edged truncated cone may result in reflections (for example specular returns) from the mouth of the cone, which reflections reduce detection performance. FIGS. 3A and 3B are respectively a top view and a side cross-sectional view of a wave matched recess 82 taken along a centerline 81 of a sensor 80, and a perspective view of the recess 82 is shown in FIG. 3C. The shape of the recess 82 improves the detection performance of the sensor 80. Specifically, as shown in FIG. 3A, the recess 82 includes an oblique horizontal forward edge 86, an upper vertical forward edge 88 and a rounded lower vertical forward edge 87. The distance from the sensor 80 to the edge 86 varies across the beam transmitted by the sensor 80, and thus, reflections from the edge 86 are not concentrated, and do not substantially reduce detection performance. The oblique angle of the edge reduces or eliminates specular returns to the sensor 80 from the oblique edge, and the rounded edge of the rounded lower vertical periphery 87 reduces reflections back towards the sensor 80. As shown in FIG. 3B, sensor 80 has a beamwidth 84 which is approximately 15 degrees and the recess 82 has a vertical width 90 of approximately 30 degrees. The recess 82 is thus wider than the beamwidth 84 to allow the main lobe of the beam to propagate through the recess 82, and the tapered walls 83 of the recess cause reflections from side lobes of the beam to reflect forward and out of the recess 82. Other acoustically tapered recess shapes may be used, such as a conically tapered horn.

Figure 4:
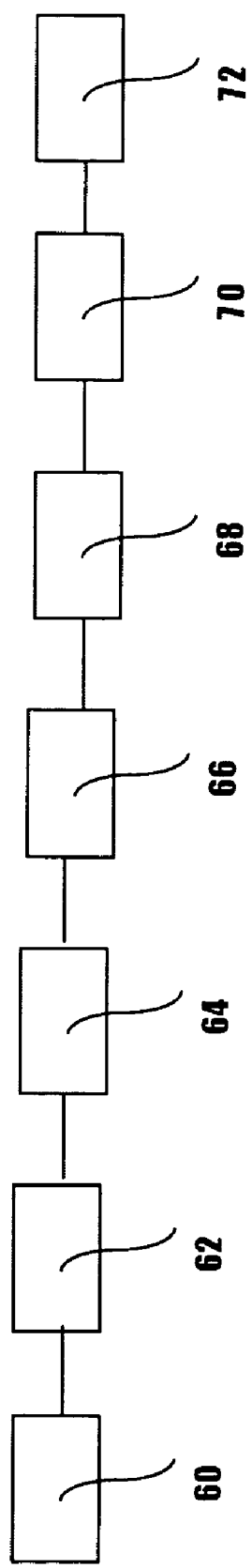
FIG. 4 is a flow diagram depicting the method whereby the mobile vehicle detects objects.

FIG. 4 is a flow diagram depicting the method according to the present invention. In particular, a method for the present invention is disclosed for controlling a direction of travel of a mobile vehicle having a front, a first side, a second side opposite the first side, a centerline parallel to a vehicle velocity vector, a forward pointing first sensor mounted in said mobile near the first side, a forward pointing second sensor mounted in said mobile near the second side, an obliquely pointing third sensor mounted in said mobile vehicle and spaced apart from said first sensor, and an obliquely pointing fourth sensor mounted in said mobile vehicle and spaced apart from said second sensor. The method comprises transmitting a forward pointing first beam from said first sensor at step 60; transmitting a forward pointing second beam from said second sensor at step 62, transmitting an obliquely pointing third beam from the third sensor to create a first overlapping beam zone at step 64, transmitting an obliquely pointing fourth beam from the fourth sensor to create a second overlapping beam zone at step 66, and processing object detections in the overlapping beam zones to determine steering commands for said mobile vehicle.

The step of processing object detections may comprise processing detections in the first overlapping region and in the second overlapping region with sensor fusion software to generate fused detection data at step 68, and computing the steering commands based on the fused detection data at step 70. Preferably, transmitting a forward pointing first beam from said first senor may comprise transmitting a first beam approximately 12 degrees wide to approximately 15 degrees wide, transmitting a forward pointing second beam from said second sensor may comprise transmitting a first beam approximately 12 degrees wide to approximately 15 degrees wide, transmitting an obliquely pointing third beam from the third sensor may comprise transmitting a first beam approximately 12 degrees wide to approximately 15 degrees wide, and transmitting an obliquely pointing fourth beam from the fourth sensor may comprise transmitting a first beam approximately 12 degrees wide to approximately 15 degrees wide. More preferably, transmitting a forward pointing first beam from said first senor may comprise transmitting an approximately 15 degrees wide, transmitting a forward pointing second beam from said second sensor may comprise transmitting an approximately 15 degrees wide beam. transmitting an obliquely pointing third beam from the third sensor may comprise transmitting an approximately 15 degrees wide beam, and transmitting an obliquely pointing fourth beam from the fourth sensor may comprise transmitting an approximately 15 degrees wide beam.

Another preferred method of the present method for controlling the direction of travel of the mobile vehicle further comprises the steps of collecting data coverage about the location of the object, and processing the data using fusion software. The fusion software increases the confidence of the position of the object ahead of the mobile vehicle. Fusion software allows a user to fuse the measurements of the object's position as the mobile vehicle approaches the object using multiple zones of coverage. For example, as the mobile vehicle approaches the object, the object will pass through multiple increasingly closer overlapping beam zones, increasing the confidence level that the mobile vehicle is approaching the object.

As such, this multiple detection by overlapping beam zones allows a user to generate more confidence of the presence and position of the object so that the mobile vehicle can maneuver around it. In other words, the fusion software represents a method for improving the detection and localization of an object in the vehicles path. By fusing the data from multiple beams, the confidence that a detection is an object, and the confidence that the position of the object is known is improved.

In the alternative, the present method further includes the step of mounting spaced-apart sensors along the mobile vehicle to provide more than two overlapping beam zones, wherein the spaced-apart sensors are configurable to provide scanning area coverage selected from the range of approximately 190-degrees to approximately 200-degrees.

Another alternative embodiment of the present inventive method further includes the step of mounting a third sensor near a center of the front of the mobile vehicle, whereby the third sensor transmits a third object detecting beam comprising a light detecting and ranging (LIDAR) beam toward the object in front of the mobile vehicle and toward a peripherally located object or wall.

Information as herein shown and described in detail is fully capable of attaining the above-described object of the invention and the present preferred embodiment of the invention, and is, thus, representative of the subject matter which is broadly contemplated by the present invention. The scope of the present invention fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more." All structural and functional equivalents to the elements of the above-described preferred embodiment and additional embodiments that are known to those of ordinary skill in the art are hereby expressly incorporated by reference and are intended to be encompassed by the present claims.

Moreover, no requirement exists for a device or method to address each and every problem sought to be resolved by the present invention, for such to be encompassed by the present claims. Furthermore, no element, component, or method step in the present disclosure is intended to be dedicated to the public regardless of whether the element, component, or method step is explicitly recited in the claims. However, one skilled in the art should recognize that various changes and modifications in form and material details may be made without departing from the spirit and scope of the inventiveness as set fourth in the appended claims. No claim herein is to be construed under the provisions of 35 U.S.C. § 112, sixth paragraph, unless the element is expressly recited using the phrase "means for."

INDUSTRIAL APPLICABILITY

The present invention relates to a sensor array for a mobile vehicle. More particularly, this invention applies industrially to a sensor array for a mobile vehicle traveling in the Forward direction having a first sensor and a second sensor. The first sensor is mounted to the mobile vehicle at a maximum lateral distance from said vertical axis of rotation. The second sensor is mounted to the mobile vehicle at a maximum lateral distance from said vertical axis of rotation. The first and the second sensor are applied industrially to illuminate objects directly ahead the mobile vehicle and create zones of overlapping beam coverage with other obliquely emitted beams from the mobile vehicle to improve the accuracy of detecting approaching objects.

I claim:

1. A sensor array for a mobile vehicle, having a front, a first side, a second side opposite the first side, and a centerline parallel to a vehicle velocity
   vector and traveling in a forward direction comprising:
   a plurality of sensors mounted generally along said front of said mobile vehicle transmitting a plurality of object detecting beams, said plurality of sensors including
   a first sensor mounted near the first side for transmitting a forward pointing first beam;
   a second sensor mounted near the second side for transmitting a forward pointing second beam
   a third sensor mounted in said mobile vehicle and spaced apart from said first sensor, which third sensor transmits an obliquely pointing third beam which intersects with said first beam to create a first overlapping beam zone; and
   a fourth sensor mounted in said mobile vehicle and spaced apart from said second sensor, which fourth sensor transmits an obliquely pointing fourth beam which intersects with said second beam to create a second overlapping beam zone,
   wherein said beams have a beamwidth within the range of approximately 12 degrees to approximately 15 degrees.

2. A sensor array for said mobile vehicle of claim 1, wherein said beams have a beamwidth of approximately 15 degrees.

3. A sensor array for a mobile vehicle, having a front, a first side, a second side opposite the first side, and a centerline parallel to a vehicle velocity vector and traveling in a forward direction comprising:
    a plurality of sensors mounted generally along said front of said mobile vehicle transmitting a plurality of object detecting beams, said plurality of sensors including
    a first sensor mounted near the first side for transmitting a forward pointing first beam;
    a second sensor mounted near the second side for transmitting a forward pointing second beam
    a third sensor mounted in said mobile vehicle and spaced apart from said first sensor, which third sensor transmits an obliquely pointing third beam which intersects with said first beam to create a first overlapping beam zone;
    a fourth sensor mounted in said mobile vehicle and spaced apart from said second sensor, which fourth sensor transmits an obliquely pointing fourth beam which intersects with said second beam to create a second overlapping beam zone; and
    sensor fusion software to provide an increased confidence level for detecting objects in the overlapping beam zones.

4. A sensor array for a mobile vehicle, having a front, a first side, a second side opposite the first side, and a centerline parallel to a vehicle velocity vector and traveling in a forward direction comprising:
    a plurality of sensors mounted generally along said front of said mobile vehicle transmitting a plurality of object detecting beams, said plurality of sensors including
    a first sensor mounted near the first side for transmitting a forward pointing first beam;
    a second sensor mounted near the second side for transmitting a forward pointing second beam
    a third sensor mounted in said mobile vehicle and spaced apart from said first sensor, which third sensor transmits an obliquely pointing third beam which intersects with said first beam to create a first overlapping beam zone;
    a fourth sensor mounted in said mobile vehicle and spaced apart from said second sensor, which fourth sensor transmits an obliquely pointing fourth beam which intersects with said second beam to create a second overlapping beam zone;
    said first sensor is mounted within a first recess and said second sensor is mounted within a second recess, thereby reducing blind range; and
    said first recess includes at least one oblique exterior edge and said second recess includes at least one oblique exterior edge.

5. A sensor array for a mobile vehicle, having a front, a first side, a second side opposite the first side, and a centerline parallel to a vehicle velocity vector and traveling in a forward direction comprising:
    a plurality of sensors mounted generally along said front of said mobile vehicle transmitting a plurality of object detecting beams, said plurality of sensors including
    a first sensor mounted near the first side for transmitting a forward pointing first beam;
    a second sensor mounted near the second side for transmitting a forward pointing second beam
    a third sensor mounted in said mobile vehicle and spaced apart from said first sensor, which third sensor transmits an obliquely pointing third beam which intersects with said first beam to create a first overlapping beam zone;
    a fourth sensor mounted in said mobile vehicle and spaced apart from said second sensor, which fourth sensor transmits an obliquely pointing fourth beam which intersects with said second beam to create a second overlapping beam zone;
    said first sensor is mounted within a first recess and said second sensor is mounted within a second recess, thereby reducing blind range; and
    said first recess comprises a first conically shaped horn that transitions a small piston diameter acoustical beamwidth radiating from said first sensor and to a larger piston diameter acoustical beam, and said second recess which comprises a second conically shaped horn that transitions a small piston diameter acoustical beamwidth radiating from said second sensor to a large diameter acoustical beamwidth.

6. A sensor array for a mobile vehicle, having a front, a first side, a second side opposite the first side, and a centerline parallel to a vehicle velocity vector and traveling in a forward direction comprising:
    a plurality of sensors mounted generally along said front of said mobile vehicle transmitting a plurality of object detecting beams, said plurality of sensors including
    a first sensor mounted near the first side for transmitting a forward pointing first beam;
    a second sensor mounted near the second side for transmitting a forward pointing second beam
    a third sensor mounted in said mobile vehicle and spaced apart from said first sensor, which third sensor transmits an obliquely pointing third beam which intersects with said first beam to create a first overlapping beam zone; and
    a fourth sensor mounted in said mobile vehicle and spaced apart from said second sensor, which fourth sensor transmits an obliquely pointing fourth beam which intersects with said second beam to create a second overlapping beam zone; and
    said plurality of sensors are symmetrically spaced-apart sensors, wherein the symmetrically spaced-apart sensors are located in different planes.

7. A sensor array for a mobile vehicle, having a front, a first side, a second side opposite the first side, and a centerline parallel to a vehicle velocity vector and traveling in a forward direction comprising:
    a plurality of sensors mounted generally along said front of said mobile vehicle transmitting a plurality of object detecting beams, said plurality of sensors including
    a first sensor mounted near the first side for transmitting a forward pointing first beam;
    a second sensor mounted near the second side for transmitting a forward pointing second beam
    a third sensor mounted in said mobile vehicle and spaced apart from said first sensor, which third sensor transmits an obliquely pointing third beam which intersects with said first beam to create a first overlapping beam zone; and
    a fourth sensor mounted in said mobile vehicle and spaced apart from said second sensor, which fourth sensor transmits an obliquely pointing fourth beam which intersects with said second beam to create a second overlapping beam zone; and
    said plurality of sensors are asymmetrically spaced-apart sensors, wherein the asymmetrically spaced-apart sensors are located in a same plane.

8. A sensor array for a mobile vehicle, having a front, a first side, a second side opposite the first side, and a centerline parallel to a vehicle velocity vector and traveling in a forward direction comprising:

a plurality of sensors mounted generally along said front of said mobile vehicle transmitting a plurality of object detecting beams, said plurality of sensors including a first sensor mounted near the first side for transmitting a forward pointing first beam;

a second sensor mounted near the second side for transmitting a forward pointing second beam a third sensor mounted in said mobile vehicle and spaced apart from said first sensor, which third sensor transmits an obliquely pointing third beam which intersects with said first beam to create a first overlapping beam zone; and a fourth sensor mounted in said mobile vehicle and spaced apart from said second sensor, which fourth sensor transmits an obliquely pointing fourth beam which intersects with said second beam to create a second overlapping beam zone; and said plurality of sensors are asymmetrically spaced-apart sensors wherein the asymmetrically spaced-apart sensors are located in different planes.

9. A sensor array for a mobile vehicle, having a front, a first side, a second side opposite the first side, and a centerline parallel to a vehicle velocity vector and traveling in a forward direction comprising:

a plurality of sensors mounted generally along said front of said mobile vehicle transmitting a plurality of object detecting beams, said plurality of sensors including a first sensor mounted near the first side for transmitting a forward pointing first beam;

second sensor mounted near the second side for transmitting a forward pointing second beam a third sensor mounted in said mobile vehicle and spaced apart from said first sensor, which third sensor transmits an obliquely pointing third beam which intersects with said first beam to create a first overlapping beam zone; and a fourth sensor mounted in said mobile vehicle and spaced apart from said second sensor, which fourth sensor transmits an obliquely pointing fourth beam which intersects with said second beam to create a second overlapping beam zone; and said spaced-apart sensors for said mobile vehicle are arranged in a rectangular shape with rounded corners configured in a U-shaped arrangement.

10. A method for controlling a direction of travel of a mobile vehicle having a front, a first side, a second side opposite the first side, a centerline parallel to a vehicle velocity vector, a forward pointing first sensor mounted in said mobile near the first side, a forward pointing second sensor mounted in said mobile near the second side, an obliquely pointing third sensor mounted in said mobile vehicle and spaced apart from said first sensor, and an obliquely pointing fourth sensor mounted in said mobile vehicle and spaced apart from said second sensor, the method comprising:

transmitting a forward pointing first beam from said first sensor;

transmitting a forward pointing second beam from said second sensor;

transmitting an obliquely pointing third beam from the third sensor to create a first overlapping beam zone;

transmitting an obliquely pointing fourth beam from the fourth sensor to create a second overlapping beam zone; and processing object detections in the overlapping beam zones to determine steering commands for said mobile vehicle.

11. A method for controlling direction of travel of said mobile vehicle of claim 10, the step of processing object detections may comprise the steps of:

processing detections in the first overlapping region and in the second overlapping region with sensor fusion software to generate fused detection data; and computing the steering commands based on the fused detection data.

12. A method for controlling direction of travel of said mobile vehicle of claim 10, wherein:

transmitting a forward pointing first beam from said first senor comprises transmitting a first beam approximately 12 degrees to approximately 15 degrees wide;

transmitting a forward pointing second beam from said second sensor comprises transmitting a first beam approximately 12 degrees to approximately 15 degrees wide;

transmitting an obliquely pointing third beam from the third sensor comprises transmitting a first beam approximately 12 degrees to approximately 15 degrees wide; and transmitting an obliquely pointing fourth beam from the fourth sensor comprises transmitting a first beam approximately 12 degrees to approximately 15 degrees wide.

13. A method for controlling direction of travel of said mobile vehicle of claim 10, wherein:

transmitting a forward pointing first beam from said first senor comprises transmitting an approximately 15 degrees wide;

transmitting a forward pointing second beam from said second sensor comprises transmitting an approximately 15 degrees wide;

transmitting an obliquely pointing third beam from the third sensor comprises transmitting an approximately 15 degrees wide; and transmitting an obliquely pointing fourth beam from the fourth sensor comprises transmitting an approximately 15 degrees wide.

14. A sonar transducer array for a mobile vehicle, the vehicle having a front, a first side, a second side opposite the first side, and a centerline parallel to a vehicle velocity vector and traveling in a forward direction, the array comprising:

a plurality of sonar transducers mounted generally along said front of said mobile vehicle, the sensors transmitting a plurality of object detecting beams, said plurality of sensors including:

a first sonar transducer mounted in a first waved matched recess near the first side for transmitting a forward pointing first beam; and a second sonar transducer mounted in a second waved matched recess near the second side for transmitting a forward pointing second beam.

15. The array of claim 14, wherein the waved matched recesses include at least one oblique forward edge.

16. The array of claim 14, wherein the waved matched recesses include at least one rounded forward edge.

* * * * *